(12) United States Patent
Feehrer et al.

(10) Patent No.: US 9,026,705 B2
(45) Date of Patent: May 5, 2015

(54) INTERRUPT PROCESSING UNIT FOR PREVENTING INTERRUPT LOSS

(75) Inventors: John R. Feehrer, Westford, MA (US); Fred Han-Ching Tsai, Cupertino, CA (US); Ali Vahidsafa, Palo Alto, CA (US); Sumti Jairath, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 351 days.

(21) Appl. No.: 13/571,051

(22) Filed: Aug. 9, 2012

(65) Prior Publication Data

US 2014/0047151 A1    Feb. 13, 2014

(51) Int. Cl.
*G06F 13/24* (2006.01)
*G06F 9/48* (2006.01)

(52) U.S. Cl.
CPC .............. *G06F 13/24* (2013.01); *G06F 9/4812* (2013.01)

(58) Field of Classification Search
CPC ............................... G06F 9/4812; G06F 13/24
USPC ................................................. 710/266–268
See application file for complete search history.

(56) References Cited

U.S. PATENT DOCUMENTS

| | | | | |
|---|---|---|---|---|
| 5,247,675 A * | 9/1993 | Farrell et al. | ................... | 718/103 |
| 5,283,904 A * | 2/1994 | Carson et al. | ................... | 710/266 |
| 5,410,710 A * | 4/1995 | Sarangdhar et al. | .......... | 710/266 |
| 5,495,615 A * | 2/1996 | Nizar et al. | .................... | 710/260 |
| 5,560,019 A * | 9/1996 | Narad | ............................ | 710/260 |
| 6,971,103 B2 * | 11/2005 | Hokenek et al. | ............... | 718/107 |
| 7,058,743 B2 * | 6/2006 | Ostrovsky et al. | ............ | 710/260 |
| 7,117,285 B2 * | 10/2006 | Ota | ............................... | 710/265 |
| 7,657,683 B2 * | 2/2010 | Sridhar et al. | ................. | 710/260 |
| 7,664,823 B1 * | 2/2010 | Wakerly | ......................... | 709/211 |
| 7,769,938 B2 * | 8/2010 | Kaushik et al. | ................ | 710/268 |
| 7,962,771 B2 * | 6/2011 | Song et al. | ..................... | 713/300 |
| 8,307,053 B1 * | 11/2012 | Wakerly | ......................... | 709/221 |
| 8,312,195 B2 * | 11/2012 | van Riel | ......................... | 710/267 |
| 8,762,994 B2 * | 6/2014 | Saripalli | ........................ | 718/100 |
| 2005/0033831 A1 * | 2/2005 | Rashid | ........................... | 709/220 |
| 2005/0033889 A1 * | 2/2005 | Hass et al. | ..................... | 710/260 |
| 2008/0126652 A1 * | 5/2008 | Vembu et al. | .................. | 710/268 |
| 2009/0007150 A1 * | 1/2009 | Li et al. | .......................... | 719/321 |
| 2010/0242041 A1 * | 9/2010 | Plondke et al. | ................ | 718/103 |

* cited by examiner

*Primary Examiner* — Paul R Myers
(74) *Attorney, Agent, or Firm* — Meyertons, Hood, Kivlin, Kowert & Goetzel, P.C.; Michael B. Davis; Dean M. Munyon

(57) ABSTRACT

Techniques are disclosed relating to systems that allow sending and receiving of interrupts between processing elements. In various embodiments, a system includes an interrupt processing unit that in turn includes various indicators corresponding to processing elements. In some embodiments, the interrupt processing unit may be configured to receive an interrupt and determine whether a first processing element associated with the interrupt is available to receive interrupts. The system may initiate a corrective action if the first processing element is not available to receive interrupts. In some embodiments, the corrective action may include redirecting the interrupt to a second processing element. In some embodiments, the interrupt processing unit may include a dropped interrupt management register to store information corresponding to the second processing element. In some embodiments, the corrective action may include altering the power state of the first processing element such that it becomes available to receive interrupts.

13 Claims, 9 Drawing Sheets

INTERRUPT PROCESSING UNIT FOR PREVENTING INTERRUPT LOSS

BACKGROUND

1. Technical Field

This disclosure relates to processors, and more specifically to interrupt processing (for example, in power-managed servers).

2. Description of the Related Art

Power management is increasingly important in the high-performance server industry. Customers prefer to minimize the total cost of ownership of such servers, which includes electricity costs and facility cooling costs.

Many servers include a number of multi-core, multi-threaded processors. For example, a server might include 8 processors, each with 8 cores, each supporting 8 threads (for a total of 512 threads). Often, processor workloads vary depending on performance requirements, the time of day, etc. At times, all threads on all cores on all processors may be busy; at other times, only a few cores have busy threads. Cores that are not busy are often selectively directed to enter a lower power state to save power. For example, cores may be powered down may have their clocks disabled. Turning off power to a core may entail a longer re-initialization sequence to bring the core back to a powered state, but saves more power than turning off the clock to a core. Turning off the clock to a core allows the core to be disabled and re-enabled more quickly, but saves less power. Typically, several operating system instances share the same server hardware and each operating system may execute various software applications. Power management software often monitors utilization of processor cores and notifies software applications via the operating system instances when it decides to dynamically disable or enable a core (e.g., by modifying power state, a clock, etc.).

Interrupts generated by hardware input/output (I/O) devices and interrupts generated by software are typically directed through configuration registers or tables to a specific thread and/or a specific core of a specific processor. Interrupts are typically asynchronous events, so an interrupt source (or initiator) may receive no specific acknowledgment that an interrupt is received. Therefore, if an interrupt is sent to a core that is powered down or has its clock disabled, the interrupt may be eventually lost. Further, the source of the interrupt (e.g., a software application executing on a particular core or peripheral device) may not know that the loss or drop occurred. The consequences of dropped interrupts can be serious, including reduced application performance if devices or software re-issue dropped interrupts. In some cases, dropped interrupts may even cause applications to fail.

Software-based solutions are one approach to dropped interrupts. Power-management software may communicate with application software (i.e., the software that generates the interrupt) to attempt to ensure that an interrupting processing element does not send an interrupt to a processing element once the processing element has been powered down. Power-management software may similarly communicate with peripheral devices. But, software-based solutions may not be satisfactory for a number of reasons.

SUMMARY

The present disclosure relates to a system that is configured to send and receive interrupts between processing elements of the system. In various embodiments, the system includes an interrupt processing unit that in turn includes various indicators corresponding to processing elements.

In some embodiments, the interrupt processing unit is configured to receive an interrupt and determine whether a first processing element associated with the interrupt is available to receive interrupts. The system may initiate a corrective action if the first processing element is not available to receive interrupts.

In some embodiments, the interrupt processing unit may include an interrupt enable register that is configured to indicate whether various processing elements are available to receive interrupts.

In some embodiments, the corrective action may include redirecting the interrupt to a second processing element.

In some embodiments, the interrupt processing unit may include a dropped interrupt management register to store information corresponding to the second processing element. In some embodiments, the interrupt processing unit may include one or more interrupt dropped registers corresponding to the first processing element, which may indicate that an interrupt directed to the first processing element is redirected.

In some embodiments, the corrective action may include altering the power state of the first processing element such that it becomes available to receive interrupts.

In various embodiments, the first and second processing elements may correspond to portions or circuits of processor cores, processor cores, processors, and/or portions of a system that include several processors.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Introduction

Figure 1:
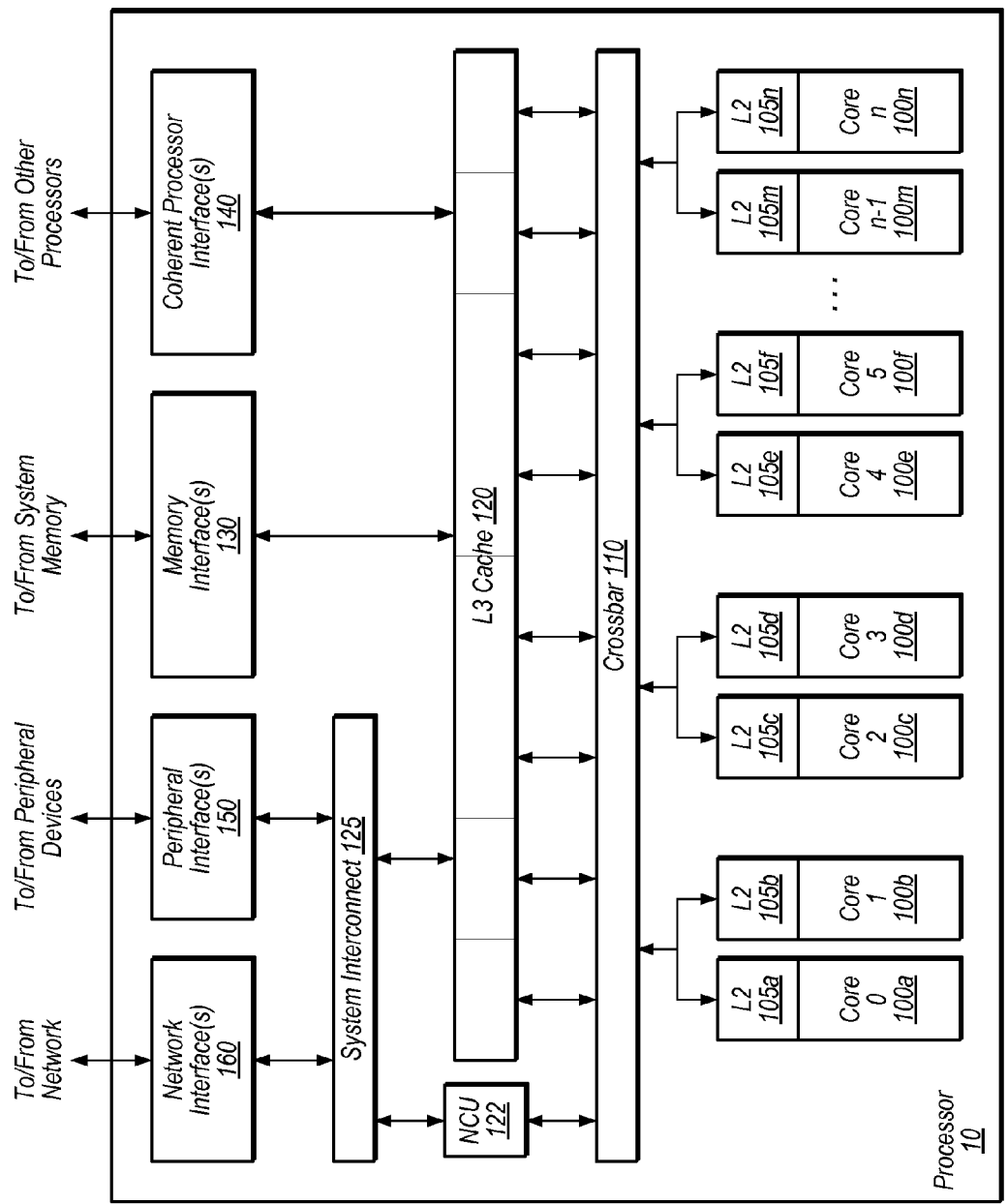
FIG. 1 is a block diagram illustrating one embodiment of an exemplary processor.
Figure 2:
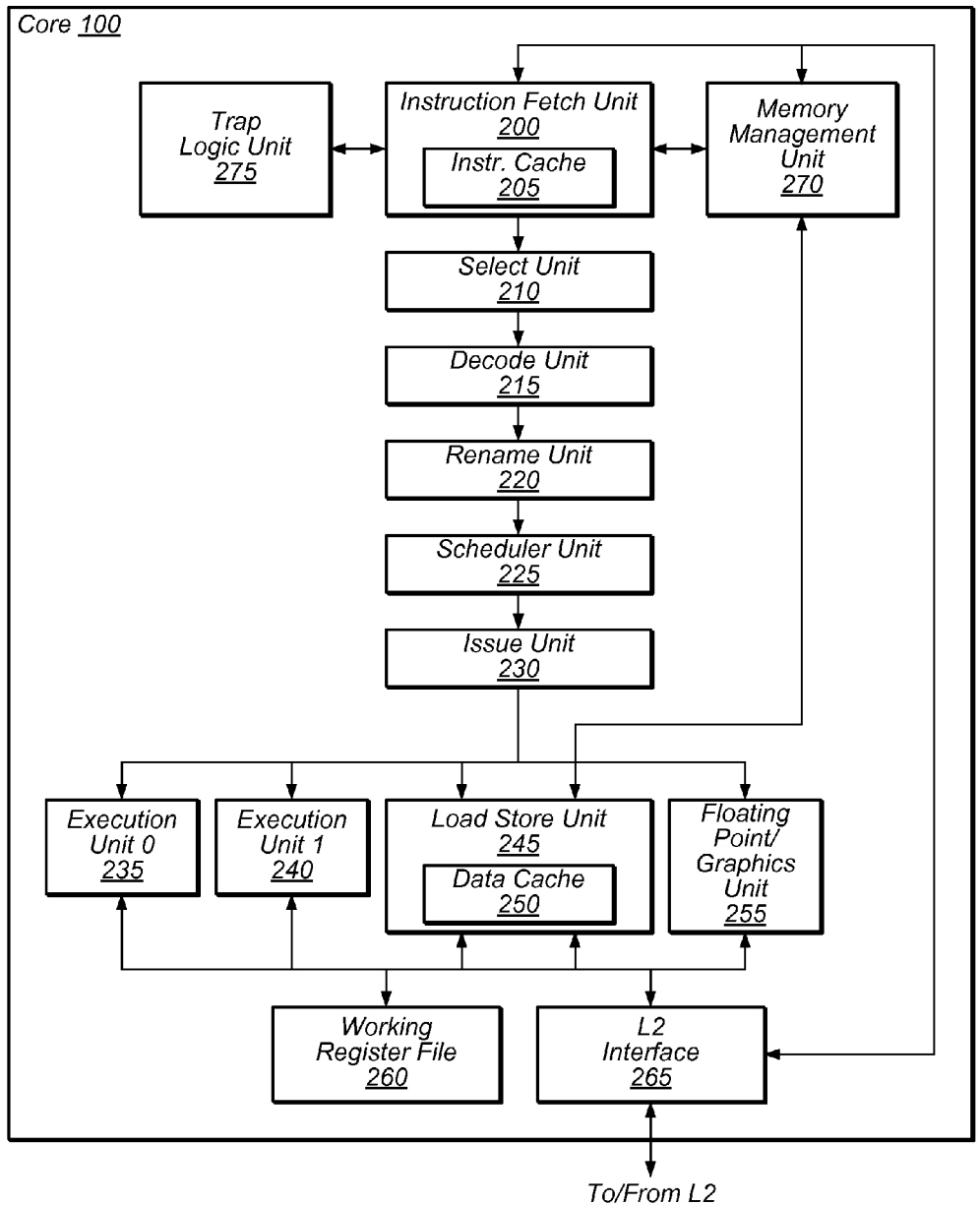
FIG. 2 is a block diagram illustrating one embodiment of an exemplary processor core.
Figure 3:
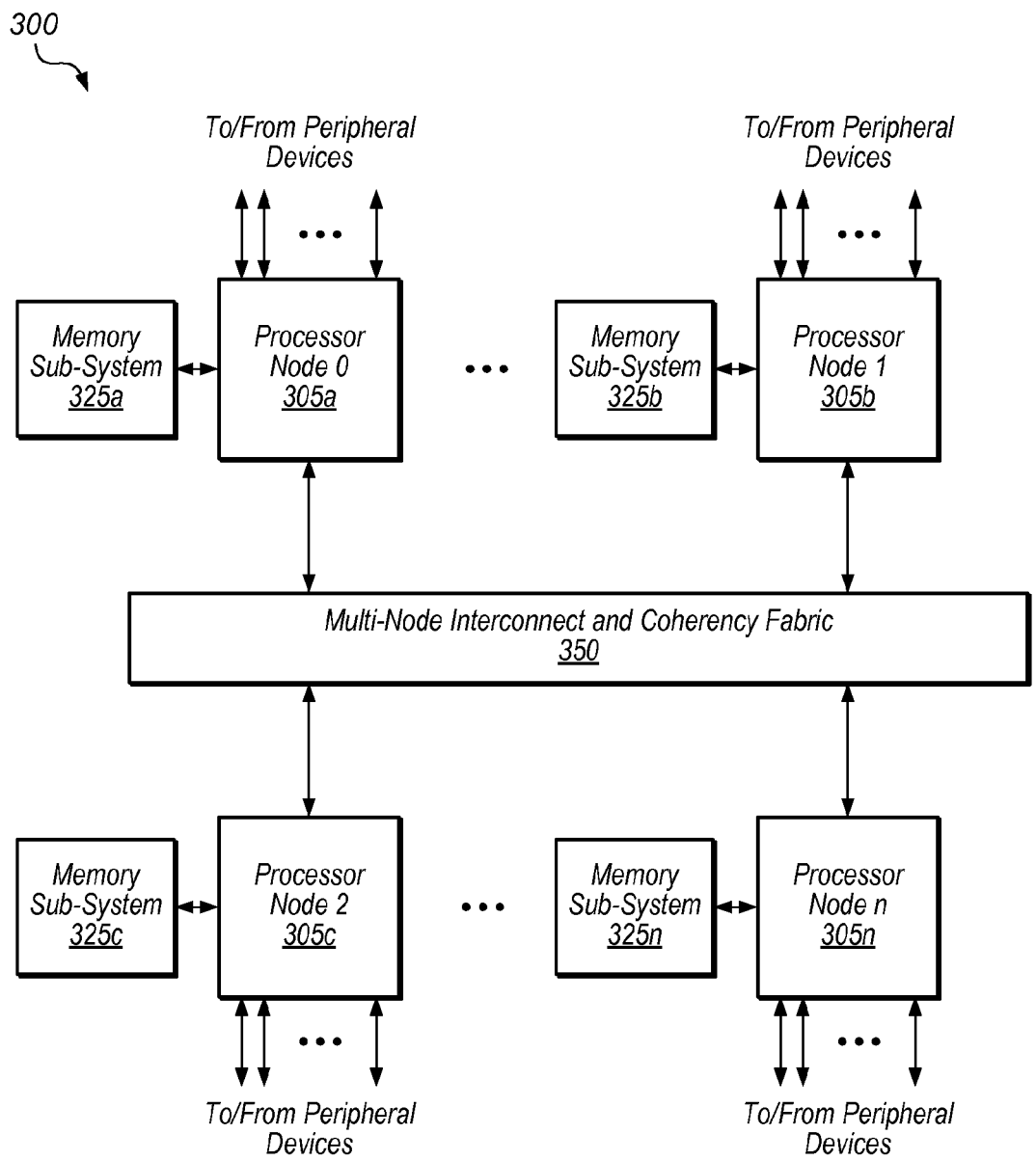
FIG. 3 is a block diagram illustrating one embodiment of an exemplary multiprocessor system.
Figure 4:
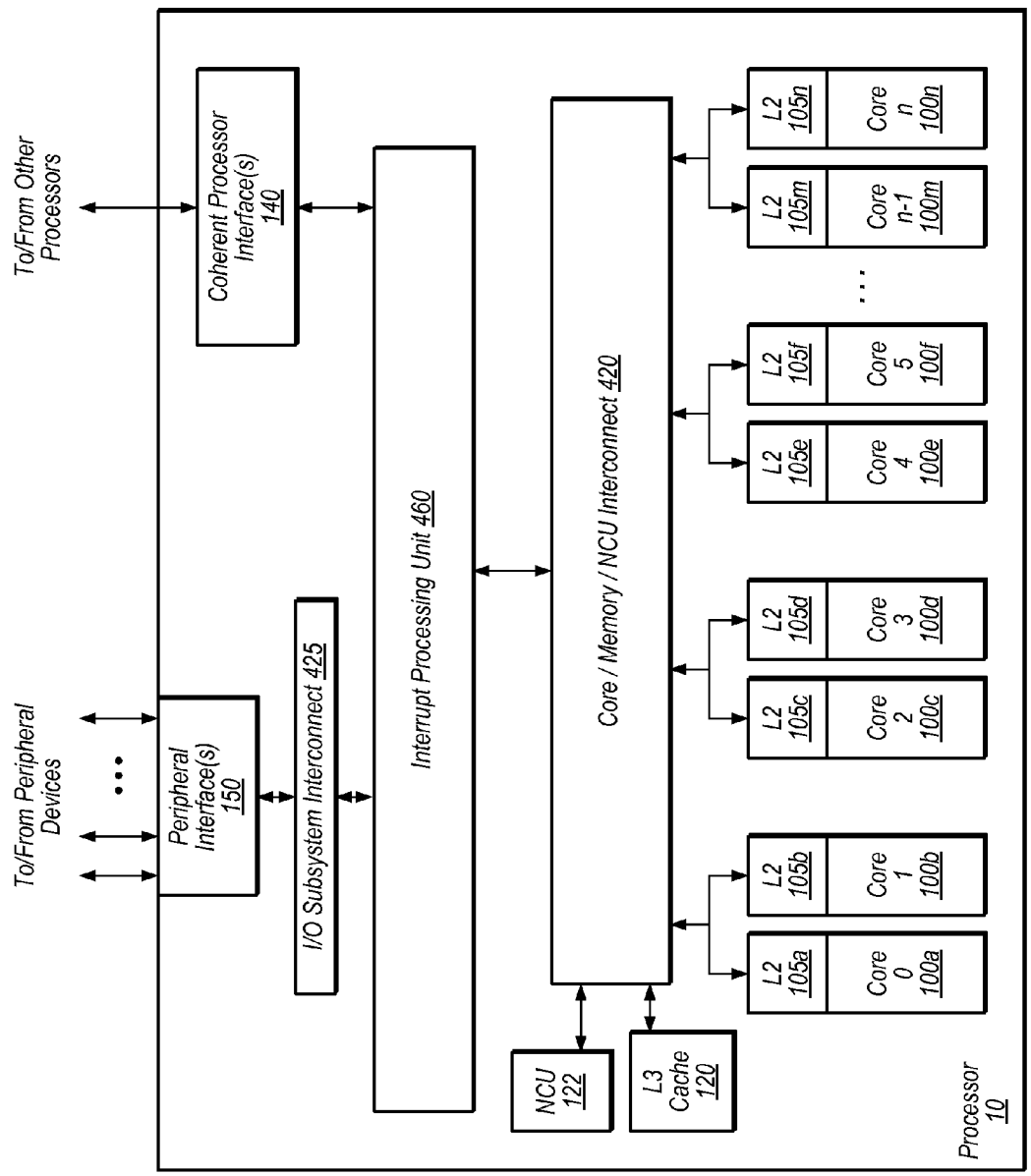
FIG. 4 is a block diagram illustrating one embodiment of an exemplary processor with an interrupt processing unit.
Figure 5:
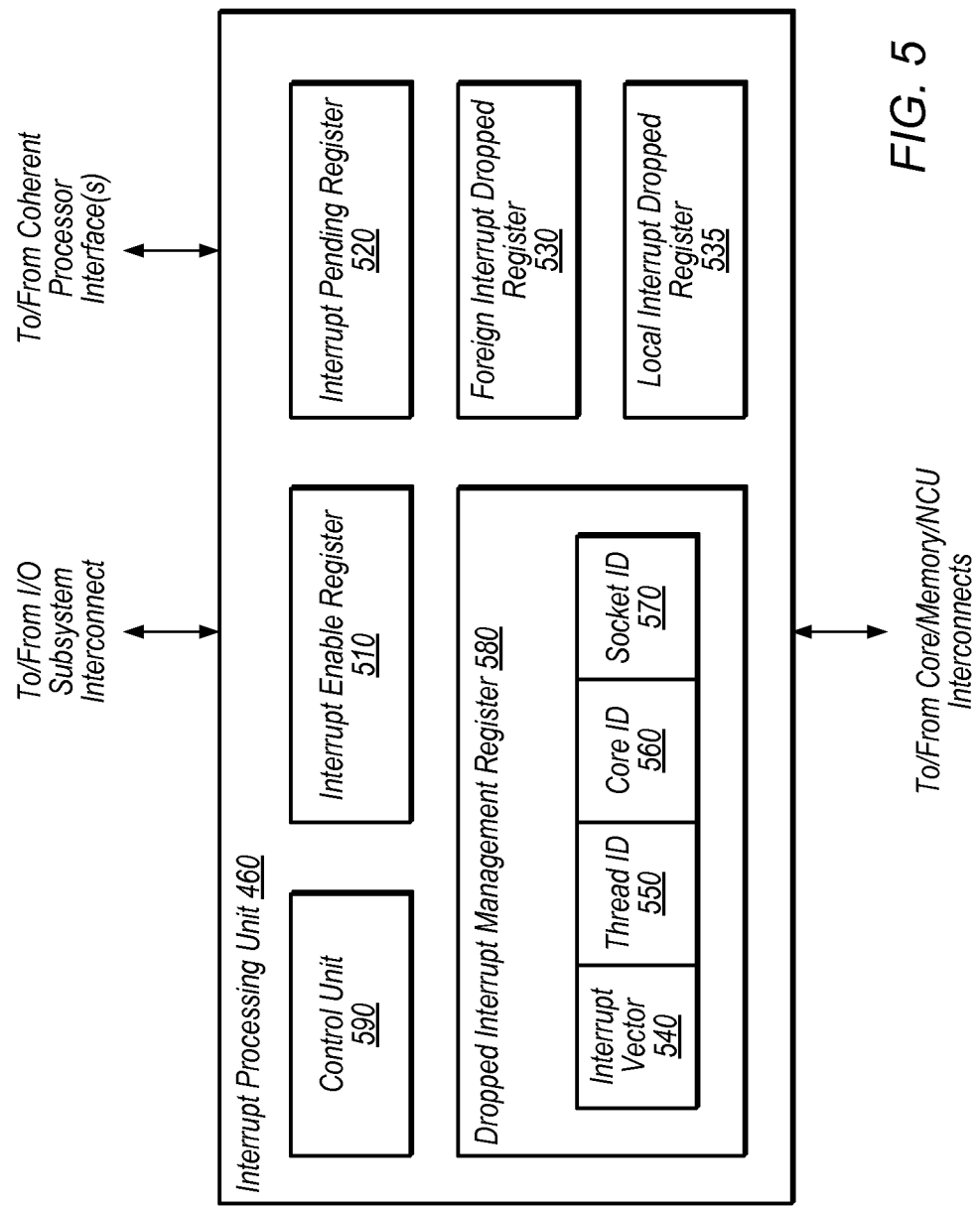
FIG. 5 is a block diagram illustrating one embodiment of an interrupt processing unit within a processor.
Figure 6:
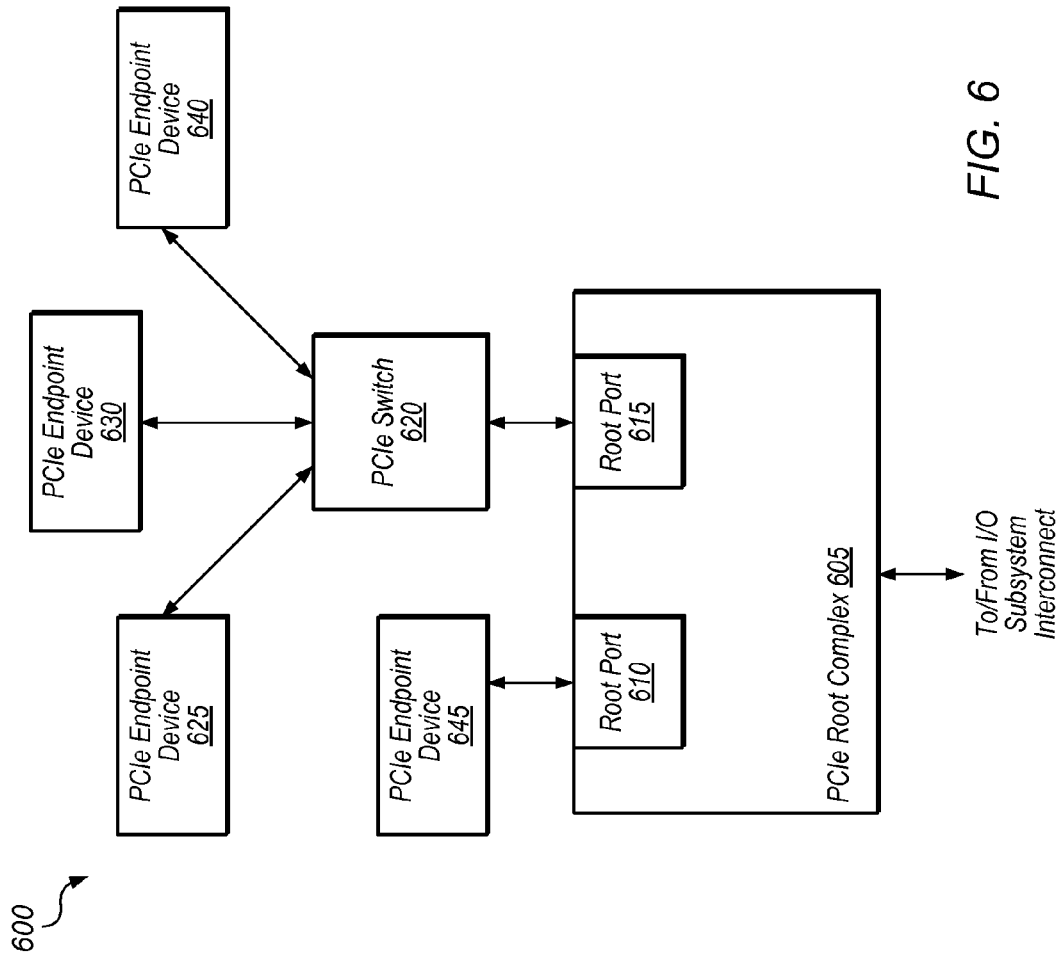
FIG. 6 is a block diagram illustrating one embodiment of a peripheral interface within a processor and peripheral devices connected to the peripheral interface.
Figure 7A:
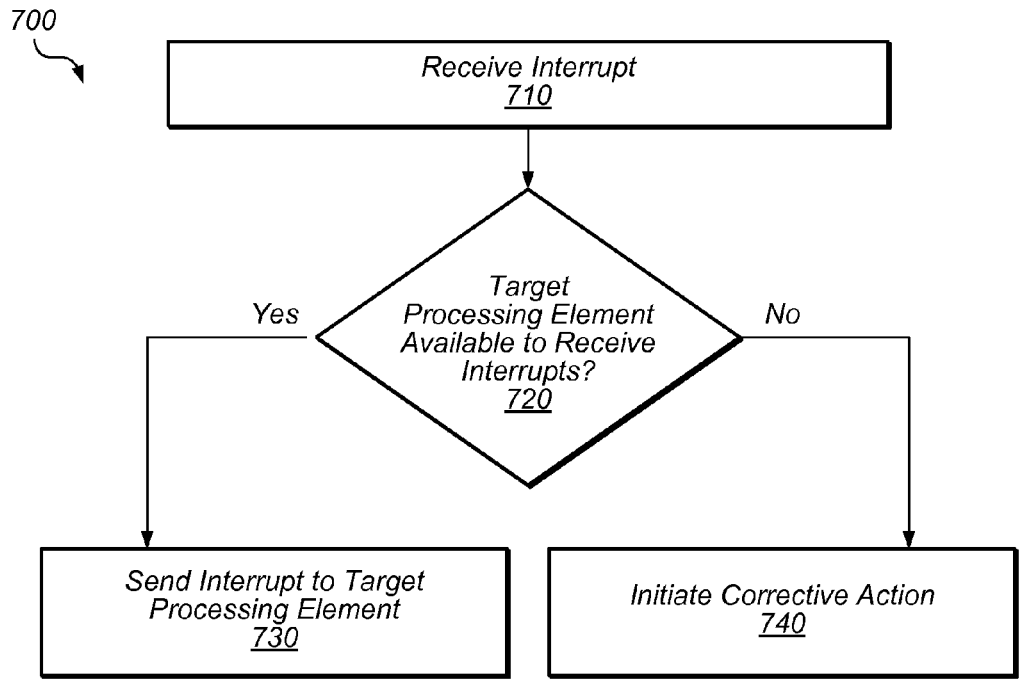
FIGS. 7*a* and 7*b* are flow diagrams illustrating embodiments of a method for preventing dropped interrupts in a system.
Figure 7B:
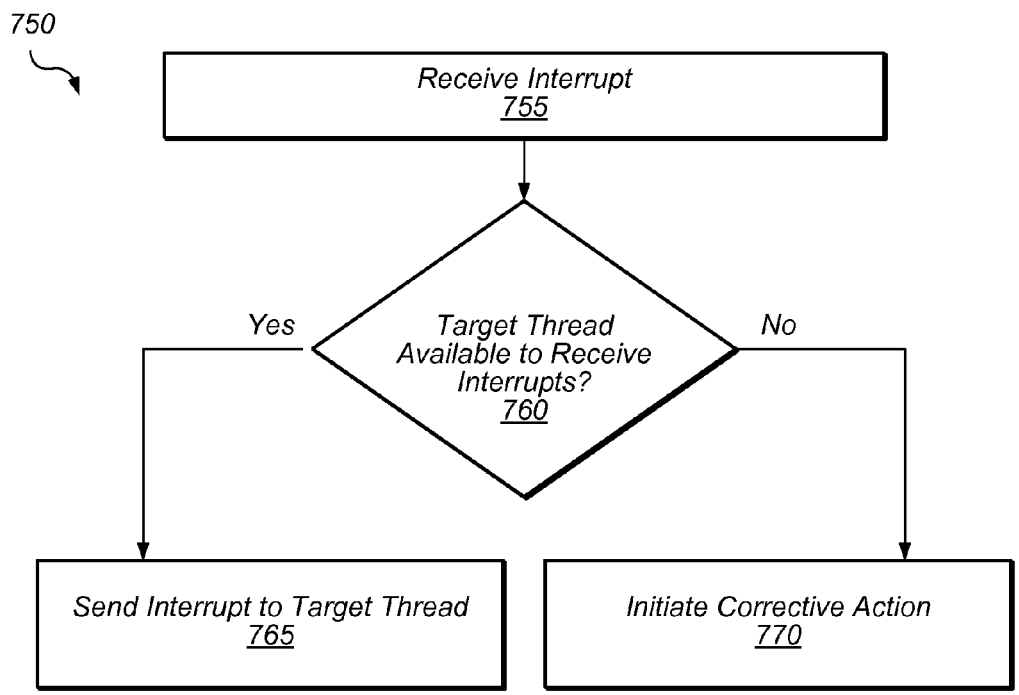
Figure 8:
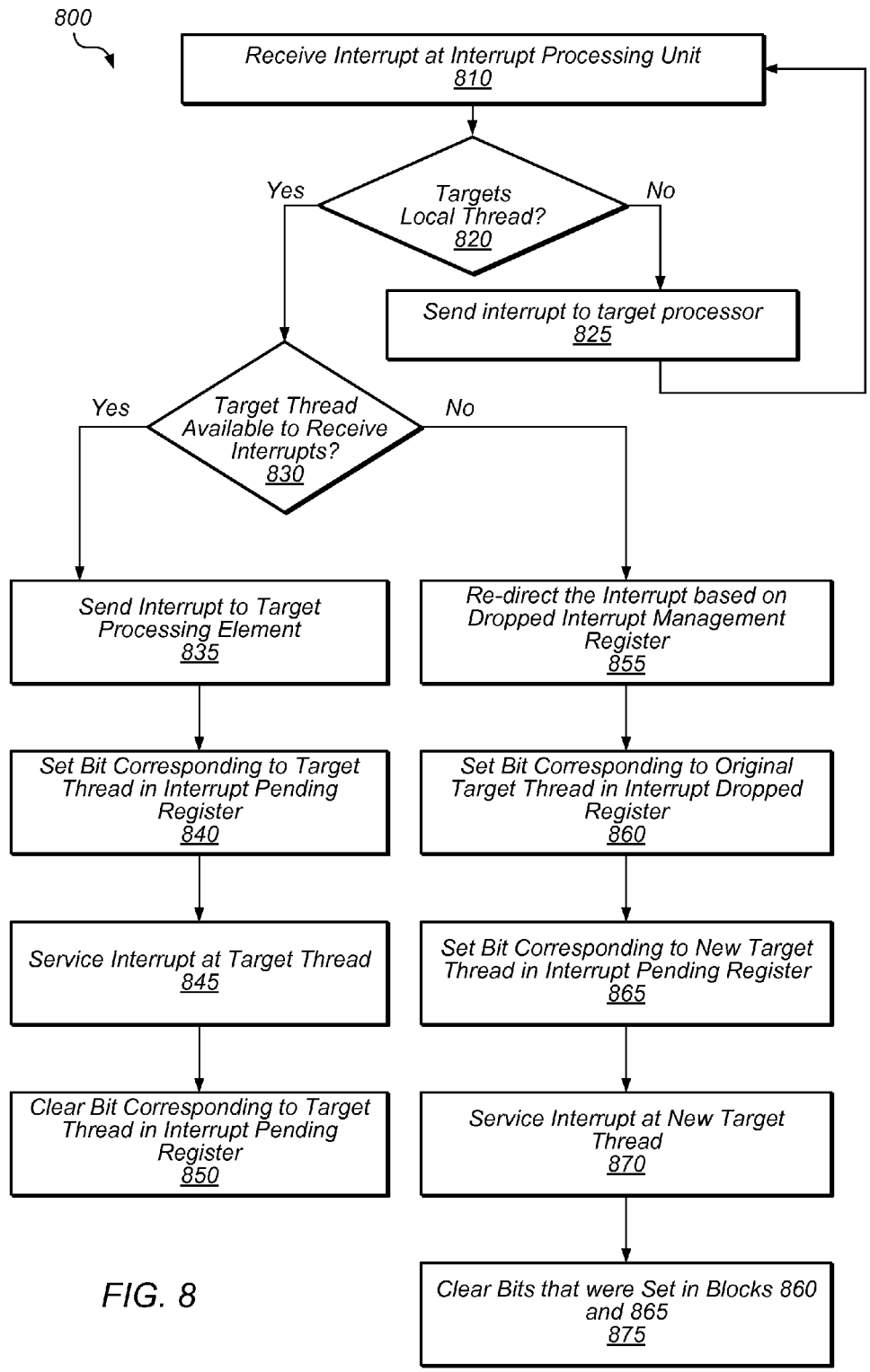
FIG. 8 is a flow diagram illustrating a more specific embodiment of a method for preventing dropped interrupts in a system.
Figure 9:
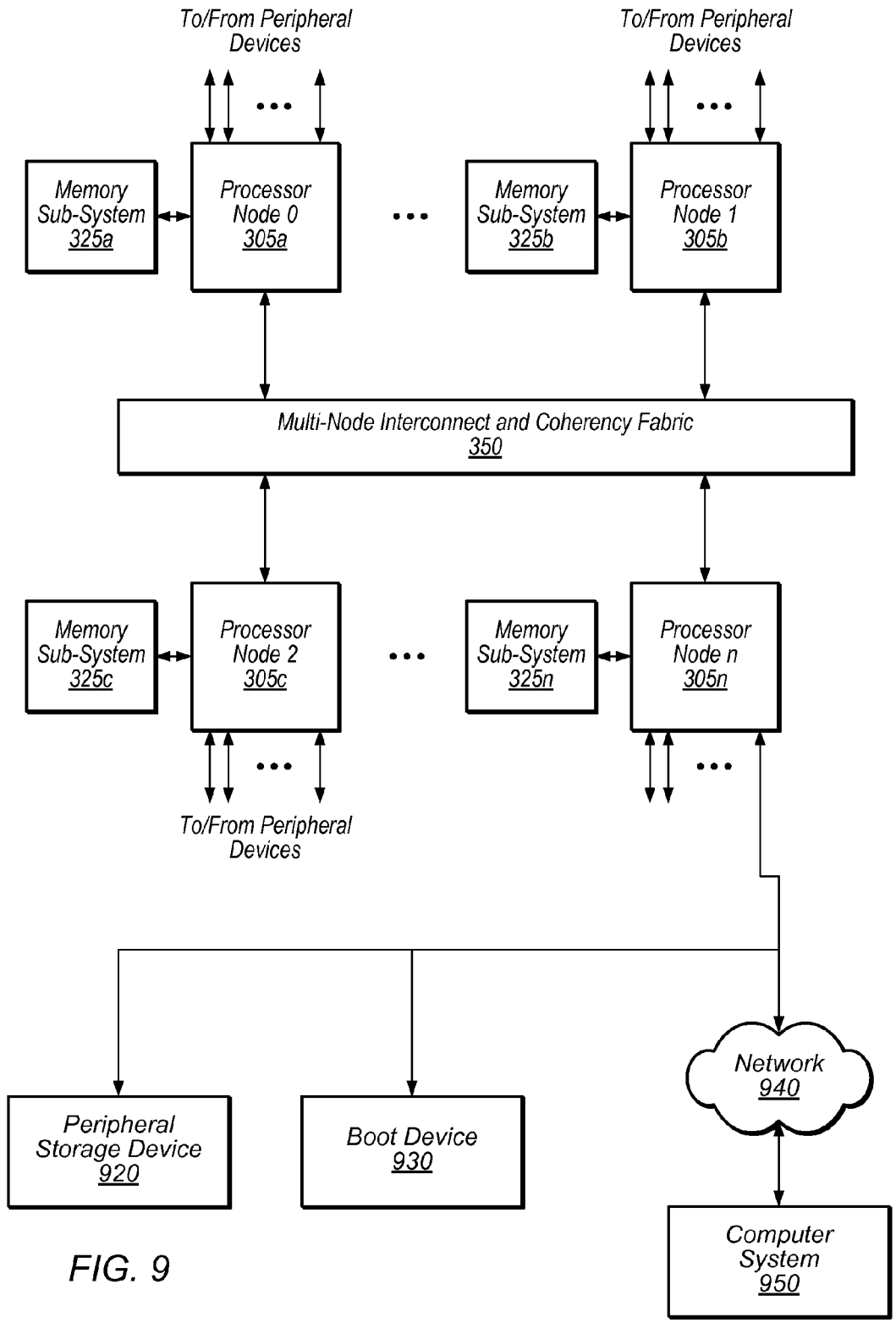
FIG. 9 is a block diagram illustrating one embodiment of an exemplary system.

The present disclosure describes embodiments of an interrupt processing unit that is configured to prevent interrupt loss in a processing system. FIGS. 1 and 2 present an overview of an exemplary multithreaded processor. FIG. 3 presents an exemplary multiprocessor system. FIGS. 4 and 5 present embodiments of an interrupt processing unit. FIG. 6 presents an embodiment of a PCI-Express peripheral subsystem. FIGS. 7*a*, 7*b*, and 8 present embodiments of operation of an interrupt processing unit. Finally, FIG. 9 presents an overview of an exemplary system embodiment.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

General Overview of a Multithreaded Processor

Turning now to FIG. 1, a block diagram illustrating one embodiment of a processor 10 is shown. In certain embodiments, processor 10 may be multithreaded. In the illustrated embodiment, processor 10 includes a number of processor cores 100*a-n*, which are also designated "core 0" though "core n." As used herein, the term processor may refer to an apparatus having a single processor core or an apparatus that includes two or more processor cores. Various embodiments of processor 10 may include varying numbers of cores 100, such as 8, 16, or any other suitable number. Each of cores 100 is coupled to a corresponding L2 cache 105*a-n*, which in turn couple to L3 cache 120 via a crossbar 110. Cores 100*a-n* and L2 caches 105*a-n* may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel (i.e., concurrently). Additionally, as described below in conjunction with the descriptions of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, write-back cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a write-back buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a write-back cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write through instead of write-back behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a write-back buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requestors.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI-Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI-Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Turning now to FIG. 2, one embodiment of core 100 that is configured to perform dynamic multithreading is depicted. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a scheduler unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating-point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating-point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, scheduler unit 225 may be configured to pick (i.e., schedule/dispatch) instructions that are ready for execution and send the picked instructions to issue unit 230. In one embodiment, scheduler unit 225 may be configured to maintain a schedule queue that stores a number of decoded and renamed instructions as well as information about the relative age and status of the stored instructions. During each execution cycle, this embodiment of scheduler unit 225 may pick up to one instruction per slot. For example, taking instruction dependency and age information into account, for a given slot, scheduler unit 225 may be configured to pick the oldest instruction for the given slot that is ready to execute.

In some embodiments, scheduler unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, scheduler unit 225 may be configured to deliberately insert "holes" (as referred to as "bubbles") into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking LSU 245 may also include hardware configured to support atomic load-store instructions, memory-related exception detection, and read and write access to special-purpose registers (e.g., control registers).

Floating-point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating-point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requestors. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

General Overview of a Multiprocessor System

Turning now to FIG. 3, a block diagram illustrating one embodiment of a multiprocessor system or server 300 is shown. In the illustrated embodiment, the system 300 includes a number of processor nodes (or "sockets") 305a-n, which are also designated "processor node 0" through "processor node n." Each of processor nodes 305 may include a processor such as processor 10. Various embodiments of system 300 may include different numbers of processors, such as 4, 8, 16, or any other suitable number. Each of processor nodes 305 is coupled to multi-node interconnect and coherency fabric 350 to communicate with other processors. For example, processor 10 includes coherent processor interface(s) 140 for coupling to other processors through such a fabric. Each of processor nodes 305 is coupled to a corresponding memory sub-system 325a-n. In various embodiments, memory sub-systems 325 may include system memory, caches, etc. For example, processor 10 includes memory interface(s) 130 for coupling to a memory subsystem such as the memory subsystems 325. Each of the processors in processor nodes 305 may also be coupled to one or more peripheral devices.

In some embodiments of system 300, peripheral devices and/or processors in processor nodes 305 may generate interrupts. In varying embodiments of system 300, cores such as core 100n of processor 10 may send interrupts to other cores of a particular processor in a processor node such as processor node 305n. In this case, the interrupt does not leave the processor node 305n. Cores such as core 100n may also send interrupts to one of cores 100 of another processor through multi-node interconnect and coherency fabric 350. For example, a processor 10 in processor node 305b may send an interrupt to a processor 10 in processor node 305n (and the interrupt may be directed to a particular thread of a particular core of the processor 10 in processor node 305n). Similarly, peripheral devices connected to a processor in one of processor nodes 305 may send interrupts to a processor in the processor node 305 to which they are connected and/or to a processor in another of processor nodes 305 through multi-node interconnect and coherency fabric 350.

Overview of Power Management and Dropped Interrupts

In various embodiments of FIG. 3, software and/or hardware may alter the power states of processing elements of system 300 in order to reduce power consumption. As used herein, the term "processing element" may refer to various elements or combinations of elements of system 300 that are capable of receiving interrupts. Processing elements include, for example, portions or circuits of individual processor cores, entire processor cores, individual processors, and/or larger portions of systems that include multiple processors (e.g., a portion that includes multiple processor nodes 305 of system 300).

Associated with a processing element is its "power state." As used herein, this term broadly refers to the amount of power being consumed by the element, the amount of circuitry associated with the element that is active (i.e., consuming power), a categorization of the element's power state according to a particular specification, a clocking state of the element, and so on. For example, the Advanced Configuration and Power Interface (ACPI) specification defines various global, system (e.g., S0, S1, etc.), processor (e.g., C0, C1, etc.), performance (e.g., P0, P1, etc.), and device states (e.g. D0, D1, etc.). ACPI power states may be controlled by an operating system, while other specifications may define power states that are controlled by firmware, power-management software, and so on.

The phrase "altering the power state" refers to changing an element's power state. Such a change can occur in various ways. For example, the power state of a processing element may be changed by powering down some or all of the circuitry in the element. In one embodiment, one or more clocks of a processing element may be altered or disabled. In one embodiment, various clocking states may correspond to various power states of a processing element. In another embodiment, certain functionality of an element may temporarily be suspended to reduce power. In yet another embodiment, a voltage level and/or a clock frequency of a processing element may be scaled. As still another example, the power state of a processing element may be changed by placing it in a different state according to a particular specification (e.g., the ACPI specification described above). In general, dynamic power management (e.g., altering the power state of processing elements of system 300 during operation of system 300) allows efficient use of processing resources. Processing elements of system 300 that are under-utilized may be placed in a lower power state to reduce power consumption. When available processing elements are over-utilized, processing elements that are not currently available may be powered on to meet processing demand.

Altering the power state of a particular processing element of system 300 creates a potential for lost interrupts. Interrupts are typically asynchronous events and an interrupt source typically does not receive an explicit acknowledgement that an interrupt is received or serviced. Said another way, interrupts may be described as "fire-and-forget" from the perspective of the interrupting process. In various embodiments, interrupts may be routed through configuration registers or configuration tables such that they target a specific thread of a specific core of a specific processor.

Thus, if an interrupt is sent to a processing element of system 300 that is unavailable to receive interrupts in a particular power state, the interrupt could be lost (i.e., the appropriate interrupt code is not executed and thus the interrupt is not handled). Consider a situation in which thread A running on core A sends an interrupt to thread B running on core B. Assume that core B is in a power state such that core B is unavailable to receive interrupts. In other words, core B is in a state such that it will not detect or receive the interrupt from thread A. The consequences of such a dropped interrupt may vary—in one instance, thread A may re-send the interrupt; in another, thread A may crash (i.e., execute improperly).

The present disclosure refers to the "availability" (and conversely, the "unavailability") of a processing element to receive interrupts. As used herein, this phrase refers to whether interrupt control logic has indicated that a given processing element is currently able to respond to (i.e., handle) received interrupts for processing (as opposed, for example, to a state in which a received interrupt is not guaranteed to be processed). The notion of "availability" has a temporal aspect; a given element may be available to receive interrupts at one point in time, but at a later point in time, it may be unavailable to receive interrupts.

Consider an example in which a processing element is in a power state in which interrupts sent to the processing element will be dropped (i.e. lost). In this example, interrupt control logic (e.g., logic in an interrupt processing unit) has, based on this power state information, set a value indicating that the processing element is unavailable to receive interrupts. In this example, the processing element is considered to be unavailable for interrupts because of the value set by the interrupt control logic.

In contrast, consider a second example in which a processing element is in a power state in which it can receive and handle interrupts in a timely manner. In this second example, interrupt control logic has set a value indicating that the processing element is available to receive interrupts. Accordingly, in this example, the processing element is considered to be available for interrupts because of the value set by the interrupt control logic.

Next, consider a third example in which a processing element is in a power state in which it may receive interrupts, but not handle them immediately. For instance, a processing element in a particular power state may store received interrupts in a queue for later processing. Such interrupts may not be dropped or lost, but may not be handled in a timely manner. In this example, interrupt control logic has set a value indicating that the processing element is available to receive interrupts, e.g., because the interrupts are not lost. In another example, however, interrupt control logic may set a value indicating that the processing element is unavailable to receive interrupts, e.g., in order to expedite processing of interrupts. Thus, the availability of a given processing element is based on a determination by some form of control circuitry (e.g., interrupt control logic).

In various embodiments, the determination by this control circuitry whether a particular processing element is available or unavailable to receive interrupts may be made based on various states of the processing elements or information about processing elements, power-related or otherwise. The above examples of processing elements in various power-states are provided to illustrate embodiments in which control circuitry determines whether a processing element is available to receive interrupts based on such power state information. In other embodiments, however, control circuitry may determine whether a processing element is available to receive interrupts based on other types of information. For example, a processing element may operate in an uninterruptable state (even at full power) during a given time interval; so interrupt control logic might, in these instances, indicate that such a processing element is unavailable to receive interrupts during that time interval.

Software-based solutions are one approach to dropped interrupts. In some embodiments, software such as power-management software may include a hypervisor or other hyper-privileged software. Power-management software may communicate with application software (i.e., the software that generates interrupts or programs I/O devices to generate I/O interrupts) to attempt to ensure that the application software will not send an interrupt to a processing element once the processing element has been powered down. However, there are corner cases, such as an interrupt generated before its target (processor, core, and/or thread) was powered down that is slowed in a communications fabric or hub and reaches the target processing element after it is already powered down. The wait period that would be required by power-management software to eliminate such corner cases (waiting to power down a processing element until all possible interrupts have arrived) is necessarily relatively long to account for worst-case system latencies and queuing delays and would seriously limit the "dynamic" nature of power-management and might reduce performance. Finally, because of the "fire-and forget" nature of interrupts, there is no way for software to formally guarantee that interrupts are never directed to a powered down target processing element even using a long wait period.

Interrupt Processing Unit for Preventing Interrupt Loss

Turning now to FIG. 4, a block diagram of a processor 10 including an interrupt processing unit 460 is shown. Some of the elements of the processor 10 of FIG. 1 have been simplified in FIG. 4. For example, core/memory/NCU interconnect 420 represents couplings between cores 100, L2 caches 105, L3 cache 120, NCU 122, and interrupt processing unit 460. Interrupt processing unit 460 is also coupled to I/O subsystem interconnect 425 and coherent processor interface(s) 140. Interrupts are received at interrupt processing unit 460, including at least: interrupts that target threads or cores on processor 10, interrupts that initiate from a core of processor 10, and interrupts that initiate from a peripheral device coupled to processor 10. For example, "foreign" interrupts—i.e., interrupts received at the destination processor and originating from other processors (or from peripheral devices coupled to other processors)—may pass through coherent processor interface(s) 140 to interrupt processing unit 460. Similarly, "local" interrupts—i.e., interrupts from local device such as peripherals—may pass through peripheral interface(s) 150 and I/O subsystem interconnect 425 to interrupt processing unit 460. In a similar manner, local interrupts from other processor cores may pass through core/memory/NCU interconnect 420 to interrupt processing unit 460. Interrupts initiated by a thread in one processor core that are directed to a thread of another processor core (in either the same processor or a different processor) may be referred to as "peer-to-peer" interrupts, which may be local or foreign from the perspective of the destination processor, depending on whether initiating and target cores are in the same processor or different processors, respectively. Similarly, interrupts from peripheral devices may be referred to as "device interrupts" and may also be either foreign or local interrupts.

In other embodiments, interrupt processing unit 460 may reside elsewhere in system 300. Also, interrupt processing unit 460 may correspond to larger or smaller processing elements of system 300 than a processor. For example, interrupt processing unit 460 might receive interrupts related to a larger portion of system 300 (including several processor nodes) or to only a single processor core 100 of processor 10. Further, in some embodiments, an entire processing element to which interrupt processing unit 460 corresponds may be powered down entirely. For example, power-management software may power down the entire processor 10 of FIG. 4. In one embodiment, interrupt processing unit 460 is coupled to a power rail that is always on when system 300 is powered on or at least is not always powered down when processor 10 is powered down. In various embodiments, interrupt processing unit 460 remains in a power state such that it is available to process interrupts regardless of the state of corresponding processing element(s) of system 300.

Turning now to FIG. 5, a block diagram of an exemplary interrupt processing unit 460 is shown. Interrupt processing unit 460, in one embodiment, includes interrupt enable register 510, interrupt pending register 520, foreign interrupt dropped register 530, local interrupt dropped register 535, dropped interrupt management register 580, and control unit 590. Control unit 590 may be configured to read and/or modify the contents of registers 510-580. Dropped interrupt management register 580 includes interrupt vector 540, thread ID 550, core ID 560, and socket ID 570. Generally speaking, interrupt processing unit 460 may be configured to process interrupts and may prevent interrupt loss in system 300.

In one exemplary embodiment, interrupt enable register 510, interrupt pending register 520, foreign interrupt dropped register 530, and local interrupt dropped register 535 each include a number of bits and each bit corresponds to a local thread of a processor 10. For example, if a processor 10 includes 8 cores and each core includes 8 threads, there are 64 threads per processor node. In this case, each of registers 510-535 would include 64 bits, each bit corresponding to a processor thread. In other embodiments, indicators may correspond to other processing elements, such as processor cores. In one embodiment, if a processor 10 includes 8 cores, each of registers 510-535 may include 8 bits, each corresponding to a processor core. In another embodiment, if a multi-processor system includes 12 processors, each of registers 510-535 may include 12 bits, each corresponding to a processor.

In one embodiment, the bits of interrupt enable register 510 indicate whether a particular thread is available to receive interrupts. For example, when power-management software alters the power state of a particular core, it may clear (or set, depending on configuration) the bits corresponding to the threads on the core in the interrupt enable register 510 to signal that the threads are not available to receive interrupts. As used herein, references to "clearing" and "setting" a bit do not necessarily refer to writing a 0 and 1 to the bit. Rather, when referring to the presence of a binary condition, "setting" a bit is intended to refer to writing a value that indicates that the condition is true, while "clearing" a bit is intended to refer to writing a value that indicates that the condition is false. In one embodiment, control unit 590 may set or clear bits of interrupt enable register 510. In various embodiments, control unit 590 may be configured to determine whether a processing element is available to receive interrupts based on its power state. When the power-management software powers-up the particular core, it sets the bits corresponding to the threads of that core to signal that the threads are available to receive interrupts.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

In one embodiment, each bit of interrupt pending register 520 indicates whether a particular thread has an interrupt pending. In one embodiment, when an interrupt is sent to a thread, software and/or interrupt processing unit 460 sets the corresponding bit in interrupt pending register 520. In this embodiment, when the interrupt completes processing, software and/or control unit 590 clears the bit.

In one embodiment, foreign interrupt dropped register 530 and local interrupt dropped register 535 may be configured to indicate when an interrupt is received that targets a processing element that is unavailable to receive interrupts.

In one embodiment, dropped interrupt management register 580 is configured to indicate a processing element that is available to receive interrupts.

In some embodiments, when an interrupt arrives at interrupt processing unit 460 and its target thread is unavailable to receive interrupts (which can be determined based on the bit in the interrupt enable register 510 corresponding to the target thread), the interrupt processing unit does not send the interrupt to the target thread or set a bit in the appropriate position in the interrupt pending register. Instead, the interrupt processing unit sets a bit corresponding to the target thread in either foreign interrupt dropped register 530 (for foreign interrupts) or local interrupt dropped register 535 (for local interrupts). In one embodiment, interrupt processing unit 460 then redirects the interrupt to another thread based on dropped interrupt management register 580, as will be described below. In various embodiments, when an interrupt is finished executing after being redirected, the bit corresponding bit in either foreign interrupt dropped register 530 or local interrupt dropped register 535 is cleared.

In another embodiment, interrupt processing unit 460 may alter the power state of the processing element corresponding to the target thread such that it becomes available to receive interrupts, and then send the interrupt to the target thread. This may be desirable in situations where available processing elements of system 300 are over-utilized such that redirecting interrupts is undesirable or unfeasible. In other embodiments, redirecting interrupts or altering the power state of processing elements may be performed by software and/or some other element of system 300.

In the exemplary embodiment of FIG. 5, dropped interrupt management register 580 points to one or more processing elements that are designed and/or programmed to be guaranteed to be available to receive interrupts. In other words, barring a power failure, processor error, exception, etc., the one or more processing elements will be available to receive interrupts at any point in time when they are indicated by dropped interrupt management register 580. Interrupt processing unit 460 redirects interrupts based on the contents of dropped interrupt management register 580. In the embodiment of FIG. 5, thread ID 550 corresponds to the particular thread, core ID 560 corresponds to a particular core, and socket ID 570 corresponds to a particular processor of system 300. In large systems, the socket ID 570 may be subdivided into a field for a particular "shared memory multiprocessor" and a field for a particular node/socket in such a shared memory multiprocessor. In one embodiment, interrupt vector 540 encodes the relative priority level for a dropped interrupt. In various embodiments, each interrupt may include a priority level. The relative priority level of interrupt vector 540 may override or modify the priority level of interrupts that are redirected using dropped interrupt management register 580. In various embodiments, dropped interrupt management register 580 may contain one or more entries storing information corresponding to one or more processing elements that are available to receive interrupts.

In various embodiments, software or firmware programs dropped interrupt management register 580 (e.g., as part of a processor initialization routine) to point to a thread/core/processor that is designed to be guaranteed to be available to receive interrupts. In one embodiment, this is achieved by assigning a particular processing element (e.g., a particular server region, processor, core, or thread) that is always kept available to receive interrupts by power-management software. In other embodiments, other methods may guarantee that a thread or threads are always available to receive interrupts and program the dropped interrupt management register 580 to point to such a thread or threads. In general, dropped interrupt management register 580 may include information corresponding to a number of threads or processing elements of system 300 that are available to receive interrupts. Dropped interrupt management register 580 may be located elsewhere within system 300 in some embodiments. In one embodiment, a single dropped interrupt management register may be used for the entirety of system 300. In other embodiments (such as that of FIG. 5) each interrupt processing unit may include a dropped interrupt management register, and different dropped interrupt management register may store the same information or different information.

Control unit 590 may be coupled to registers 510-535 and 580 of interrupt processing unit 460. Control unit 590 may set or clear bits and/or other indicators in the registers. Similarly, control unit 590 may send and receive information from software or other hardware elements through I/O subsystem interconnect, coherent processor interface(s) and Core/Memory/NCU interconnects. In the present disclosure, various functionality described as performed by interrupt processing unit 460 may be performed by control unit 490 in some embodiments.

The registers of FIG. 5 illustrate an exemplary embodiment of indicators corresponding to whether processing elements are available to receive interrupts, whether interrupts corresponding to particular processing elements have been redirected, whether interrupts have been sent to a particular processing element, and where to send interrupts that are directed to a processing element that is unavailable to receive interrupts. In the exemplary embodiment of FIG. 5, bits in registers 510-535 correspond to processor threads. In other embodiments, bits or indicators in those registers may correspond to various processing elements. In various embodiments, interrupt processing unit 460, software, and/or some other element of system 300 may set and clear such indicators.

Interrupt processing unit 460 is described in various embodiments as processing interrupts in a multi-processor system, including redirecting interrupts and altering power states, which may prevent interrupt loss. But, interrupt processing unit 460 may also prevent interrupt loss in a single-processor system. For example, if a multi-core, multi-threaded processor such as processor 10 dynamically alters the power state of processing elements (e.g., cores) to reduce power consumption, interrupt processing unit 460 may redirect interrupts associated with processing elements that are unavailable to receive interrupts to other processing elements within the same processor that are available to receive interrupts. Interrupt processing unit 460 may also alter the power state of a processing element such that the processing element becomes available to receive interrupts in response to receiving an interrupt associated with a core that is unavailable to receive interrupts.

Turning now to FIG. 6, a block diagram of an exemplary I/O subsystem 600 is shown. As described above with reference to FIG. 4, processor 10 may include a peripheral interface 150 that is configured to couple to one or more peripheral devices. In one embodiment, these one or more peripheral devices may be coupled to peripheral interface 150 via one or more buses, such as those that use the PCI-Express (PCIe) standard.

In the embodiment shown, PCIe root complex 605 includes two root ports 610 and 615. PCIe root ports may be connected directly to PCIe endpoint device and may additionally serve as roots for trees of PCIe devices build using PCIe switches to increase connectivity. In the illustrated embodiment, root port 610 is coupled to PCIe endpoint device 645. Root port 615 is coupled to PCIe switch 620. PCIe switch 620 is coupled to PCIe endpoint devices 625-640.

Exemplary subsystem 600 may generate local interrupts (interrupts for threads on a processor to which subsystem 600 is coupled) and foreign interrupts (interrupts originating from devices attached to other processors or from threads on other processors to which subsystem 600 is coupled). For example, PCIe "message signaled interrupts" include data indicating what interrupt to trigger on what processor, core, and/or thread.

Referring to FIGS. 3, 4 and 6, consider an exemplary flow of an interrupt that is directed to a thread on processor 10. In one embodiment, this local interrupt might proceed from PCIe endpoint device 630 through PCIe switch 620, root port 615, PCIe root complex 605, I/O subsystem interconnect 425, interrupt processing unit 460, and core/memory/NCU interconnect 420, to a particular local processor core. Alternately, if the target processor core/thread was unavailable to receive interrupts, interrupt processing unit 460 might redirect the interrupt to another thread/core/processor based on dropped interrupt management register 580.

Similarly, consider the exemplary flow of an interrupt directed to a thread on a processor other than processor 10 (referred to here as a remote processor). This interrupt with a remote processor destination might proceed from PCIe endpoint device 630 through PCIe switch 620, root port 615, PCIe root complex 605 of processor 10, I/O subsystem interconnect 425, to interrupt processing unit 460. In one embodiment, upon unit 460 determining that the interrupt is directed to a thread not running on processor 10, unit 460 directs the interrupt to coherent processor interface(s) 140. Interface 140 of processor 10 may then direct the interrupt to interface 140 of another processor via multi-node interconnect and coherency fabric 350 (shown in FIG. 3). As one example, processor 10 may correspond to processor node 0 305*a* in FIG. 3 and the other processor may correspond to processor node 1 305*b* in FIG. 3. When the interrupt arrives at the other (target) processor, coherent processor interface(s) 140, in one embodiment, directs the interrupt to interrupt processing unit 460, which in turn directs the interrupt to core/memory/NCU interconnect 420, which directs the interrupt to the target core and/or thread. Alternately, if the target processor core/thread was unavailable to receive interrupts, interrupt processing unit 460 (of the target processor) might redirect the interrupt to a thread/core/processor indicated by the dropped interrupt management register 580 within interrupt processing unit of the target processor.

Thus, in various embodiments, an interrupt processing unit may comprehensively prevent interrupt loss from peripheral devices coupled to various processors of a system 300 regardless of interrupt origin and without substantially affecting system performance.

Turning now to FIG. 7*a*, a flow diagram illustrating one embodiment of a method 700 for interrupt processing is shown. Flow begins at block 710 in one embodiment.

At block 710, an interrupt is received. In one embodiment, interrupt processing unit 460 may receive the interrupt. The interrupt may be local or foreign as described above with reference to FIG. 6. In one embodiment, the interrupt is directed to a particular processing element, such as those depicted with reference to system 300. In contrast, in FIG. 7*b*

(described below) an interrupt is directed to a particular thread running on a processor element. Flow proceeds to decision block 720.

At decision block 720, it is determined whether the target processing element (the processing element to which the interrupt is directed) is available to receive interrupts. For example, a target processing element may not be available to receive interrupts because of its power state. In one embodiment, the determining of block 720 may be performed based on one or more indicators in an interrupt enable register, such as element 510 of FIG. 5. In the embodiment shown, if the target processing element is available to receive interrupts, flow proceeds to block 730; if the target processing element is not available to receive interrupts, flow proceeds to block 740.

At block 730, the interrupt is sent to the target processing element. This may involve actively directing the interrupt to the target processing element or merely allowing the interrupt to proceed to the target processing element (i.e., not impeding the interrupt). Flow ends at block 730.

At block 740, a corrective action is initiated. In one embodiment, the corrective action includes redirecting the interrupt to another processing element that is available to receive interrupts. In another embodiment, the corrective action includes altering the power state of the target processing element such that the target processing element becomes available to receive interrupts. In various embodiments, the corrective action may prevent an interrupt that targets a processing element that is unavailable to receive interrupt from being dropped. Flow ends at block 740.

Turning now to FIG. 7b, a flow diagram illustrating a method 750 of operation of another embodiment of an interrupt processing unit is shown. Flow begins at block 755.

At block 755 an interrupt is received. The interrupt may be local or foreign as described above with reference to FIG. 6. In the embodiment of FIG. 7b, the interrupt is directed to a particular thread of a processing element system 300. Flow proceeds to decision block 760.

At decision block 760, it is determined whether the target thread is available to receive interrupts. A target thread may not be available to receive interrupts because corresponding processing elements are in a low power state such that they are unable to receive interrupts. In one embodiment, the determining of block 720 may be performed based on one or more indicators in an interrupt enable register, such as element 510 of FIG. 5. If the target thread is available to receive interrupts, flow proceeds to block 765. If the target thread is not available to receive interrupts, flow proceeds to block 770.

At block 765, the interrupt is sent to the target processing element. This may involve actively directing the interrupt to the target processing element or merely allowing the interrupt to proceed to the target processing element (i.e., not impeding the interrupt). Flow ends at block 765.

At block 740, a corrective action is initiated. In one embodiment, the corrective action includes redirecting the interrupt to another processing element that is available to receive interrupts. In another embodiment, the corrective action includes altering the power state of the target processing element such that the target processing element becomes available to receive interrupts. In various embodiments, the corrective action may prevent an interrupt that targets a processing element that is unavailable to receive interrupt from being dropped. Flow ends at block 770.

Turning now to FIG. 8, a flow diagram illustrating a method 800 of operation of a further exemplary embodiment of an interrupt processing unit is shown. FIG. 8 generally corresponds to operation of the exemplary embodiment of the interrupt processing unit 460 of FIGS. 4 and 5. Flow begins at block 810.

At block 810 an interrupt processing unit receives an interrupt. The interrupt may be local or foreign as described above with reference to FIG. 6. In one embodiment, the interrupt is directed to a particular thread executing on a particular processing element of a system. Flow proceeds to decision block 820.

At decision block 820, the interrupt processing unit determines whether the interrupt targets (i.e., is directed to) a thread of the processor that includes the interrupt processing unit. If the result of decision block 820 is yes, flow proceeds to decision block 830. If the result of decision block 820 is no (e.g., the interrupt targets another processor of system 300), flow proceeds to block 825.

At block 825 the interrupt processing unit sends the interrupt to the target processor. This may involve actively directing the interrupt to the target processor or merely allowing the interrupt to proceed to the target processor (i.e., not impeding the interrupt). Flow proceeds to block 810. Note that at block 810 (when flow proceeds to block 810 from block 825) the interrupt is received at the interrupt processing unit of the target processor. At this point the interrupt is a foreign interrupt to the target processor because it did not originate from a core or peripheral device of the target processor.

At decision block 830, the interrupt processing unit determines whether the target thread is available to receive interrupts. For example, in one embodiment the interrupt processing unit determines whether the bit corresponding to the target thread in the interrupt enable register 510 is set. If the result of decision block 830 is yes, flow proceeds to block 835. If the result of decision block 830 is no, flow proceeds to block 855.

At block 835, the interrupt processing unit sends the interrupt to the target processing element. This may require actively sending the interrupt to the targeted core/thread, or simply allowing the interrupt to proceed to the targeted core/thread without impeding the interrupt. Flow proceeds to block 840.

At block 840 the interrupt processing unit sets a bit corresponding to the target thread in the interrupt pending register 520. Flow proceeds to block 845.

At block 845, the target thread services the interrupt. In one embodiment, this is performed by software. Flow proceeds to block 850.

At block 850, the interrupt processing unit clears the bit corresponding to the target thread in the interrupt pending register 520 (the bit that was set in block 840). Note that the setting and clearing of bits in blocks 840 and 850 may also be performed by software and/or some other hardware element. Flow ends at block 850.

At block 855, the interrupt processing unit redirects the interrupt based on the dropped interrupt management register 580. For example, the interrupt processing unit sends the interrupt to the thread indicated by the thread ID of the core indicated by the core ID of the processor and/or multiprocessor system indicated by the socket ID. Recall that in some embodiments of system 300, the thread/core/processor indicated by the dropped interrupt management register 580 is guaranteed to be available to receive interrupts. Flow proceeds to block 860.

At block 860 either the interrupt processing unit or software sets the bit corresponding to the original target thread in an interrupt dropped register. In one embodiment, the bit is set in either the local dropped interrupt register 530 or the foreign dropped interrupt register 535 depending on whether the interrupt was local or foreign. This may allow improved detection of cases when foreign and local interrupts arrive at the same thread almost simultaneously. Flow proceeds to block 865.

At block 865 either the interrupt processing unit or software sets the bit in the interrupt pending register 520 corresponding to the new target thread (i.e., the thread to which the interrupt is redirected). Note that the interrupt processing unit of block 865 is likely different than the interrupt processing unit of block 860. The interrupt processing unit of block 865 corresponds to the new target thread, and thus may be on a different processor than the interrupt processing unit of block 860. It is also possible that the interrupt processing units of blocks 860 and 865 are the same interrupt processing unit. Flow proceeds to block 870.

At block 870, the new target thread services the interrupt. In one embodiment, this is performed by software. Flow proceeds to block 875.

At block 875, interrupt processing unit(s) and/or software clears the bits set in the interrupt processing unit(s) in blocks 860 and 865 because the interrupt is no longer pending or dropped/redirected. Flow ends at block 875. In various embodiments, the clearing and setting of bits performed in FIG. 8 may be performed by one or more interrupt processing units, software, and/or other elements of a system such as system 300.

The exemplary method illustrated by FIG. 8 may allow comprehensive consolidation and/or processing of interrupts and may prevent interrupt loss in a power-managed processing system. Preventing interrupt loss may improve performance of a processing system and/or prevent application failures.

Exemplary System Embodiment

As described above, in some embodiments, processor 10 of FIG. 1 may be configured to interface with a number of external devices. System 300 may include a number of processors such as processor 10 in processor nodes 305. One embodiment of system 300 is illustrated in FIG. 9. In the illustrated embodiment, a processor 10 in processor node 305*n* of system 300 is coupled to a peripheral storage device 920 and a boot device 930. System 300 is also coupled to a network 940, which is in turn coupled to a computer system 950. In other embodiments, various processors in processor nodes 305 of system 300 may be coupled to various devices such as peripheral storage device 920, boot device 930, network 940, and/or other similar devices or entities. In various embodiments, system 300 may be configured as a rack-mountable server system, a standalone system, or in any other suitable form factor. In some embodiments, system 300 may be configured as a client system rather than a server system.

In various embodiments, memory sub-systems 325 may comprise any suitable type of system memory as described above, such as FB-DIMM, DDR/DDR2/DDR3/DDR4 SDRAM, RDRAM®, flash memory, and of various types of ROM, etc. memory sub-systems 325 may include multiple discrete banks of memory controlled by discrete memory interfaces in embodiments of processor 10 that provide multiple memory interfaces 130. Also, in some embodiments, memory sub-systems 325 may include multiple different types of memory.

Peripheral storage device 920, in various embodiments, may include support for magnetic, optical, or solid-state storage media such as hard drives, optical disks, nonvolatile RAM devices, etc. In some embodiments, peripheral storage device 920 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as InfiniBand Hot Channel Adaptors for high-performance clustering interconnect, multimedia devices, graphics/display devices, standard input/output devices, etc. In one embodiment, peripheral storage device 920 may be coupled to processor 10 via peripheral interface(s) 150 of FIG. 1.

As described previously, in one embodiment boot device 930 may include a device such as an FPGA or ASIC configured to coordinate initialization and boot of processor 10, such as from a power on reset state. Additionally, in some embodiments boot device 930 may include a secondary computer system configured to allow access to administrative functions such as debug or test modes of processor 10.

Network 940 may include any suitable devices, media and/or protocol for interconnecting computer systems, such as wired or wireless Ethernet, for example. In various embodiments, network 940 may include local area networks (LANs), wide area networks (WANs), telecommunication networks, or other suitable types of networks. In some embodiments, computer system 950 may be similar to or identical in configuration to illustrated system 300, whereas in other embodiments, computer system 950 may be substantially differently configured. For example, computer system 950 may be a server system, a processor-based client system, a stateless "thin" client system, a mobile device, etc. In some embodiments, processor 10 may be configured to communicate with network 940 via network interface(s) 160 of FIG. 1.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    an interrupt processing unit configured to:
        maintain, during operation, an indication of one or more threads that are available to receive redirected interrupts;
        receive an interrupt directed to a first thread; and
        determine whether the first thread is available to receive interrupts;
    wherein the apparatus is configured, in response to the interrupt processing unit determining that the first thread is not available to receive interrupts, to:
        redirect the interrupt to one of the one or more threads based on the indication;

set a first indicator specifying that an interrupt to the first thread has been redirected and whether the interrupt is local to a processing element of the first thread; and set a second indicator specifying that an interrupt is pending to the one of the one or more threads; and wherein the apparatus is configured, in response to completion of the interrupt, to clear the first and second indicators.

2. The apparatus of claim 1, wherein one or more processing elements associated with the one or more threads are configured to be available to receive interrupts during operation of the apparatus.

3. The apparatus of claim 1, further comprising altering the state of a processing element associated with the first thread such that the first thread becomes available to receive interrupts.

4. The apparatus of claim 1, wherein the interrupt processing unit is configured to determine whether the first thread is available to receive interrupts based on an indicator corresponding to a power state of a processing element associated with the first thread.

5. An apparatus, comprising:
an interrupt processing unit configured to:
maintain, during operation, an indication of one or more processing elements that are available to receive redirected interrupts;
receive an interrupt; and
determine whether a particular processing element associated with the interrupt is available to receive interrupts;
wherein the apparatus is configured, in response to the interrupt processing unit determining that the particular processing element is not available to receive interrupts, to:
redirect the interrupt to one of the one or more processing elements based on the indication;
set a first indicator specifying that an interrupt to the particular processing element has been redirected and whether the interrupt is local to the particular processing element; and
set a second indicator specifying that an interrupt is pending to the one of the one or more processing elements; and
wherein the apparatus is configured, in response to completion of the interrupt, to clear the first and second indicators.

6. The apparatus of claim 5, wherein the particular processing element is a processor core within a processor.

7. The apparatus of claim 5, wherein the one of the one or more processing elements is a processor core within a different processor.

8. The apparatus of claim 5, wherein the particular processing element is a processor.

9. The apparatus of claim 5, further comprising altering the power state of the particular processing element such that the particular processing element becomes available to receive interrupts.

10. A method, comprising:
maintaining, during operation of an interrupt processing unit, an indication of one or more processing elements that are available to receive redirected interrupts;
receiving an interrupt at the interrupt processing unit;
determining whether a first processing element associated with the interrupt is available to receive interrupts;
redirecting the interrupt to one of the one or more processing elements in response to determining that the first processing element is not available to receive interrupts;
setting a first indicator specifying that an interrupt to the first processing element has been redirected and whether the interrupt is local to the first processing element;
setting a second indicator specifying that an interrupt is pending to the one of the one or more processing elements; and
clearing the first and second indicators in response to completion of the interrupt.

11. The method of claim 10, wherein said determining is based on an indicator corresponding to a power state of the first processing element.

12. The method of claim 10, wherein said determining is based on an indicator corresponding to whether a clock to the first processing element is turned off.

13. A method, comprising:
maintaining, during operation of an interrupt processing unit, an indication of one or more threads that are available to receive redirected interrupts;
receiving an interrupt at the interrupt processing unit;
determining whether a first thread associated with the interrupt is available to receive interrupts;
redirecting the interrupt to one of the one or more threads in response to determining that the first thread is not available to receive interrupts;
setting a first indicator specifying that an interrupt to the first thread has been redirected and whether the interrupt is local to a processing element of the first thread;
setting a second indicator specifying that an interrupt is pending to the one of the one or more threads; and
clearing the first and second indicators in response to completion of the interrupt.

* * * * *

UNITED STATES PATENT AND TRADEMARK OFFICE
CERTIFICATE OF CORRECTION

| | | |
|---|---|---|
| PATENT NO. | : 9,026,705 B2 | Page 1 of 1 |
| APPLICATION NO. | : 13/571051 | |
| DATED | : May 5, 2015 | |
| INVENTOR(S) | : Feehrer et al. | |

It is certified that error appears in the above-identified patent and that said Letters Patent is hereby corrected as shown below:

In the specification

Column 12, line 12, delete "checking" and insert -- checking. --, therefor.

Signed and Sealed this
Ninth Day of February, 2016

Michelle K. Lee
*Director of the United States Patent and Trademark Office*